(12) United States Patent
Ikegami et al.

(10) Patent No.: US 10,647,141 B2
(45) Date of Patent: May 12, 2020

(54) INKJET PRINTING METHOD AND INKJET PRINTING APPARATUS

(71) Applicant: CANON KABUSHIKI KAISHA, Tokyo (JP)

(72) Inventors: Masayuki Ikegami, Atsugi (JP); Yuhei Shimizu, Kawasaki (JP); Akira Kuriyama, Atsugi (JP); Yoko Taira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/149,584

(22) Filed: Oct. 2, 2018

(65) Prior Publication Data

US 2019/0111717 A1  Apr. 18, 2019

(30) Foreign Application Priority Data

Oct. 13, 2017 (JP) .................. 2017-199627
Aug. 30, 2018 (JP) .................. 2018-162154

(51) Int. Cl.
| | |
|---|---|
| *B41M 5/00* | (2006.01) |
| *B41J 2/14* | (2006.01) |
| *C09D 11/033* | (2014.01) |
| *C09D 11/38* | (2014.01) |
| *C09D 11/037* | (2014.01) |
| *C09D 11/322* | (2014.01) |

(52) U.S. Cl.
CPC .......... *B41M 5/0023* (2013.01); *B41J 2/1433* (2013.01); *C09D 11/033* (2013.01); *C09D 11/037* (2013.01); *C09D 11/322* (2013.01); *C09D 11/38* (2013.01)

(58) Field of Classification Search
CPC .... B41J 2/1433; C09D 11/033; C09D 11/037; C09D 11/322; C09D 11/38; B41M 5/0023
See application file for complete search history.

(56) References Cited

U.S. PATENT DOCUMENTS

| | | | |
|---|---|---|---|
| 2006/0189113 A1* | 8/2006 | Vanheusden | B22F 1/0018 438/597 |
| 2008/0113195 A1 | 5/2008 | Boll | |
| 2015/0050467 A1* | 2/2015 | Nakagawa | C09D 11/322 428/195.1 |

FOREIGN PATENT DOCUMENTS

| | | |
|---|---|---|
| JP | 2-198845 A | 8/1990 |
| JP | 2004-315650 A | 11/2004 |
| JP | 2009-269935 A | 11/2009 |
| JP | 2010-507727 A | 3/2010 |

* cited by examiner

*Primary Examiner* — Lamson D Nguyen
(74) *Attorney, Agent, or Firm* — Canon U.S.A., Inc. IP Division

(57) ABSTRACT

An aqueous ink for inkjet printing contains silver particles having a particle size of 60 nm or less at a cumulative volume of 90%.

20 Claims, 1 Drawing Sheet

INKJET PRINTING METHOD AND INKJET PRINTING APPARATUS

BACKGROUND

Field of the Disclosure

The present disclosure relates to an inkjet printing method and an inkjet printing apparatus.

Description of the Related Art

An ink containing metal particles has been used to form an electric circuit by utilizing the feature of the metal particles and, in recent years, has also been applied to a card (e.g., a Christmas card) that has expressed a metallic feeling. In such a use, it is desired to print an image having high decorativeness and a metallic feeling (hereafter referred to as a "metallic image") rather than electrical conductivity required of an electric circuit. For the purpose of printing a metallic image, an aqueous ink containing silver particles has been proposed (refer to Japanese Patent Laid-Open No. 2009-269935). In addition, an inkjet printing method has been proposed in which an ink in the state of being heated is ejected from a printing head (refer to Japanese Patent Laid-Open No. 2-198845).

Based on research on ejection of the ink described in Japanese Patent Laid-Open No. 2009-269935 in the state of being heated, ejection stability of the ink was not always obtained.

SUMMARY

Accordingly, some embodiments in the present disclosure provide an inkjet printing method in which an ink has excellent ejection stability when the heated ink is ejected from a printing head. In addition, some embodiments of the present disclosure provide an inkjet printing apparatus in which the inkjet printing method is adopted.

Some embodiments of the present disclosure provide an inkjet printing method that includes ejecting a heated aqueous ink from a printing head so as to print an image on a printing medium, wherein the aqueous ink contains silver particles having a particle size of 60 nm or less at a cumulative volume of 90%.

In addition, some embodiments of the present disclosure provide an inkjet printing apparatus including an aqueous ink, a printing head configured to eject the aqueous ink, and a unit configured to heat the aqueous ink in the printing head, wherein the aqueous ink contains silver particles having a particle size of 60 nm or less at a cumulative volume of 90%.

According to some embodiments of the present disclosure, an inkjet printing method is provided in which an ink has excellent ejection stability when the heated ink is ejected from a printing head and, in addition, an inkjet printing apparatus can be provided.

Further features of various embodiments of the present disclosure will become apparent from the following description of exemplary embodiments with reference to the attached drawings.

BRIEF DESCRIPTION OF THE DRAWINGS

FIG. 1A is a perspective view of a key portion of the inkjet printing apparatus, FIG. 1B is a perspective view of a printing head, FIG. 1C is a plan view of a printing element substrate disposed on a surface opposite a printing medium in the printing head, viewed in the direction orthogonal to the XY-plane, and FIG. 1D is a diagram of an enlarged printing element substrate of the printing element substrates shown in FIG. 1C.

DESCRIPTION OF THE EMBODIMENTS

Figure 1A:
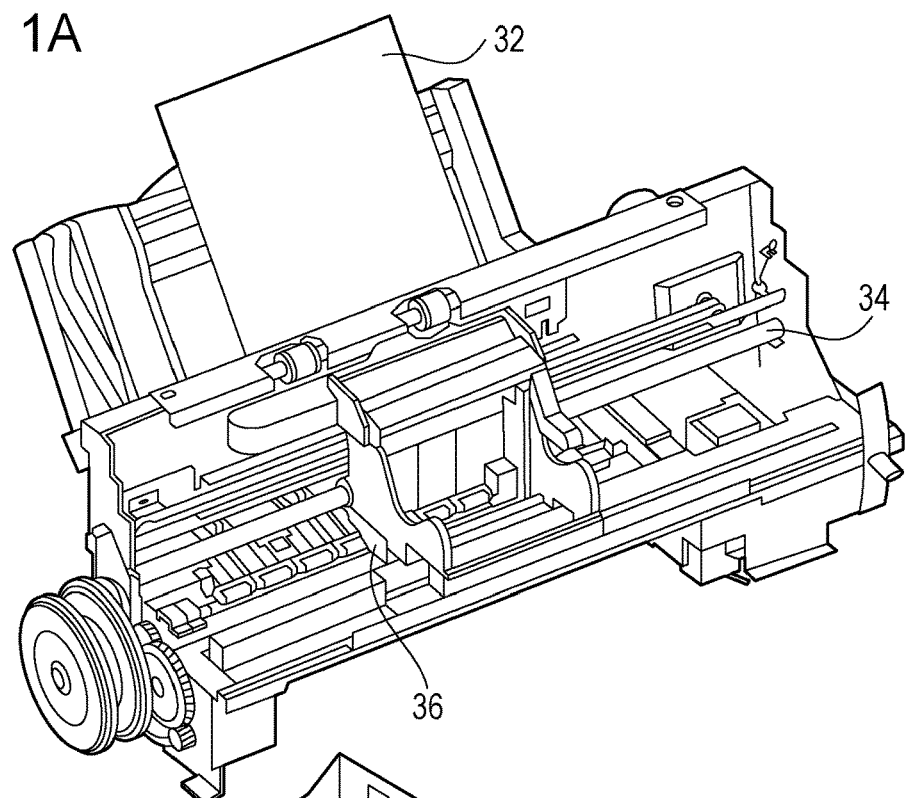
FIGS. 1A to 1D are schematic diagrams showing an example of an inkjet printing apparatus used for an inkjet printing method according to some embodiments.

Some embodiments according to the present disclosure will be described below in detail. In the present disclosure, hereafter an aqueous ink may be referred to as an "ink". Various physical property values are values at a temperature of 25° C. and 1 atmospheric pressure unless otherwise specified. Expressions of "(meth)acrylic acid" and "(meth)acrylate" represent "acrylic acid, methacrylic acid" and "acrylate, methacrylate", respectively.

When an ink containing silver particles is used, the ejection stability of the ink has to be improved relative to ink containing a coloring material (e.g., an organic pigment). The reason for this is as described below. In comparison with an image formed by using the ink containing a coloring material, the image formed by using the ink containing silver particles has high brightness that indicates the lightness of the image. Consequently, when a portion at which the ink is not ejected is present in the image, the portion is readily recognized as a defect of the image. Therefore, for the purpose of stably ejecting the ink containing silver particles, it is important to heat the ink and to reduce the viscosity of the ink.

However, when the ink containing silver particles is heated and images are successively printed by using the ink in the state of being heated, ejection stability may not be obtained. More specifically, in come circumstances, in successively printing images, when an ink was successively ejected from one ejection port and, thereafter, it was intended to eject the ink from an ejection port adjoining the above-described ejection port, the ink was not smoothly ejected. As a result of observing the ejection port, from which the ink was not smoothly ejected, by an optical microscope, it was found that silver particles adhered to the vicinity of the ejection port, and the adhering silver particles blocked the ejection port. A possible reason for this is described below.

The melting temperature of silver is usually 962° C., and it is known that the melting temperature of silver particles having a particle size of several nm to several tens of nm is lower than the usual melting temperature of silver. Silver atoms present on the surfaces of silver particles are weakly restricted by internal metal bonds and have high activity. Regarding silver particles having a particle size of several nm to several tens of nm, the proportion of silver atoms present on the surfaces relative to the total number of silver atoms constituting the particles is large. That is, in a silver particle having a small particle size, the proportion of silver atoms having high activity is large and, therefore, when another silver particle approaches, the silver particle fuses with the other silver particle so as to form a metal bond between the silver particles.

In general, when silver particles are used for forming an electric circuit, an ink containing silver particles is applied to a substrate, and heating is performed at a high temperature of about 200° C. to 300° C. Consequently, a liquid component in the ink is reduced by evaporation and adjacent silver particles fuse with each other. However, it is known that, in the situation in which the amount of liquid component present around silver particles is small and silver particles are densely present, the silver particles fuse with each other without being heated at a high temperature. When the ink containing silver particles is applied to a printing medium including an ink-receiving layer, the liquid component in the ink permeates the ink-receiving layer, but the silver particles in the ink do not permeate the ink-receiving layer so as to remain in the vicinity of the surface of the printing medium. The silver particles remaining in the vicinity of the surface of the printing medium come close to each other and readily fuse with each other because the amount of liquid component present around the silver particles is small.

The specific gravity of silver particles is very large compared with the specific gravity of a coloring material (e.g., an organic pigment) used for an inkjet ink. In general, in order to eject an ink by using an inkjet system, the viscosity of the ink has to be on the order of several mPa·s. When the ink containing the silver particles is successively ejected from the ejection port, the silver particles tend to precipitate in the direction of gravity because the specific gravity of the silver particles is large and the viscosity of the ink is low. A printing head is open in the direction of gravity. Therefore, when silver particles are precipitated, silver particles in the state of adjoining each other adhere to the vicinity of the ejection port, and silver particles come into the state of readily fusing with each other. "Silver particles in the state of adjoining each other adhere" indicates that silver particles weakly adhere to and remain in the vicinity of the ejection port. In particular, regarding the ejection port that successively ejects the ink, silver particles adhering to the vicinity of the ejection port are discharged outside the ejection port due to the energy of ejection, but silver particles adhering an ejection port that is not in use are not discharged. Therefore, in the vicinity of the ejection port that is not in use, precipitated silver particles in the state of adjoining each other adhere and, thereby, silver particles may come into the state of readily fusing with each other.

When an ink that is not heated is used, silver particles in the state of adjoining each other adhere to the vicinity of an ejection port that is not in use, but fusion of adhering silver particles does not readily occur. However, when a heated ink is used, silver particles in the state of adjoining each other adhere to the vicinity of an ejection port that is not in use, and fusion of adhering silver particles is facilitated. The reason for this is as described below. In order to eject the ink by using the inkjet system, the viscosity of the ink is essentially on the order of several mPa·s. If this ink is heated, the viscosity of the ink is further reduced and, thereby, silver particles are precipitated rapidly in the direction of gravity. In addition, if the ink in the state of being heated is used, a liquid component in the ink is readily evaporated from the ejection port, and precipitated silver particles in the state of more closely adjoining each other adhere to the vicinity of the ejection port. As a result, fusion of silver particles in the vicinity of the ejection port is facilitated, the ejection port is blocked by fused silver particles, and, therefore, ejection stability of the ink is not obtained. In particular, regarding the ejection ports that have not been used, the temperature of the ink at an ejection port adjacent to the ejection port that has successively ejected the ink is increased in accordance with an increase in the temperature at the ejection port that has successively ejected the ink. Consequently, the liquid component in the ink is more readily evaporated at the ejection port, fusion of silver particles is further facilitated, and ejection stability of the ink is not obtained. That is, an issue "ejection stability of the ink" occurs specifically in the case in which the ink containing silver particles is heated and ejected.

In order to obtain the ejection stability of the ink, some embodiments suppress precipitation of silver particles and make adhesion hard to occur when precipitation occurs. As a result, a particle size of silver particles at a cumulative volume of 90% was noted. Here, Stokes formula ($V=\{g(\rho_s-\rho)d^2\}/18\mu$) will be described. V represents a precipitation velocity (cm/s), g represents a gravitational acceleration (980.7 cm/s$^2$), $\rho_s$ represents a density of a particle (g/cm$^3$), and $\rho$ represents a density of a dispersion medium (g/cm$^3$). In addition, d represents a particle size (cm), and $\mu$ represents a viscosity of a dispersion medium (g/cm·s). According to Stokes formula, the precipitation velocity V of particles increases in proportion to the square of the particle size. That is, as the particle size increases, silver particles are readily precipitated. In some embodiments, an indicator including such easy-to-precipitate silver particles having a large particle size is used, and in some embodiments, the particle size at a cumulative volume of 90%, which was a particle diameter when the volume accumulated from the small diameter side reached 90%, was noted. Silver particles having particle sizes that fall within large-side 10% in the cumulative distribution exert a small effect on the ejection stability of the ink because their frequency is low in spite of a large particle size. When the particle size at a cumulative volume of 90% is decreased, the precipitation velocity of silver particles is reduced. Further, it was found that when the particle size at a cumulative volume of 90% was decreased, silver particles did not readily adhere even if silver particles were precipitated in the vicinity of the ejection port because silver particles did not remain in the vicinity of the ejection port and moved due to convection of the ink. Essentially, silver particles did not readily adhere to the vicinity of the ejection port, the ejection port was not readily blocked by fused silver particles, and ejection stability of the ink was obtained. Accordingly, some embodiments obtain ejection stability of the ink by setting the particle size of silver particles at a cumulative volume of 90% to be 60 nm or less.

Inkjet Printing Method

In the present disclosure, "an aqueous ink is heated" refers to the aqueous ink being warmed to a higher than normal temperature (25° C.). When the temperature of the aqueous ink ejected from the printing head is 50° C. or higher, fusion of silver particles in the vicinity of the ejection port is further facilitated, and, thereby, an issue "ejection stability of the ink" tends to occur. In some embodiments, the aqueous ink is ejected in the state of being heated to a temperature of preferably 70° C. or lower. In an inkjet printing method according to some embodiments, an image is printed on a printing medium by ejecting a heated aqueous ink from a printing head. Examples of ink ejection systems include a system in which thermal energy is applied and a system in which mechanical energy is applied. In particular, the ink ejection system can be the system in which thermal energy is applied.

The ink may be heated by using a sub-heater before ejection based on image data, or be heated by using an ejection heater during ejection based on image data. When the ink is ejected by the system in which thermal energy is applied, the ink may be heated by using a printing head having no heat dissipation plate or increasing the ejection frequency of the ink. When the printing head having no heat dissipation plate is used, the ink is readily heated because the printing head has a configuration in which heat is not readily dissipated. The ejection frequency of the ink is the number of times of ejection per second of the printing head, and as the ejection frequency of the ink increases, the ink is readily heated. In particular, the ink can be heated by using a sub-heater before ejection based on image data.

The image printed by the inkjet printing method according to some embodiments can be silver. Regarding silver, $a^*$ and $b^*$ in the $L^*a^*b^*$ display system specified by International Commission on Illumination (CIE) satisfy $-10<a^*<10$ and $-10<b^*<10$. When $a^*$ and $b^*$ satisfy the above-described range, it is recognized that the image is silver. In this regard, $a^*$ and $b^*$ may be measured by using a spectrophotometer.

Figure 1B:
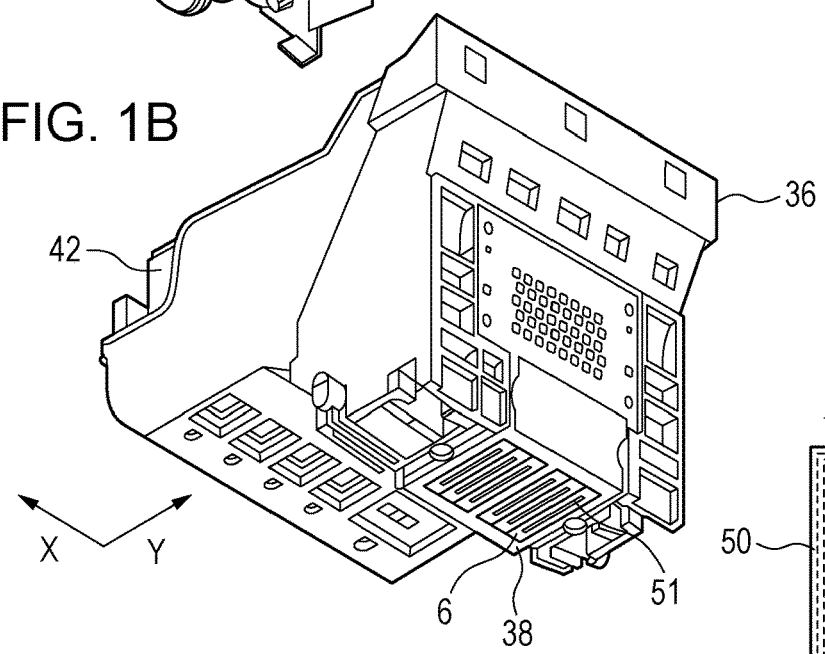
Figure 1D:
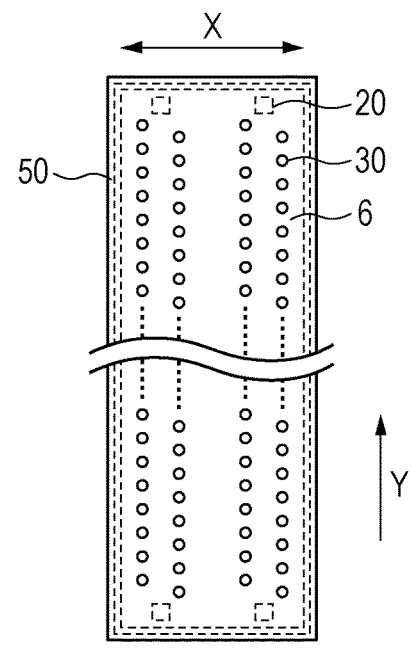
Figure 1C:
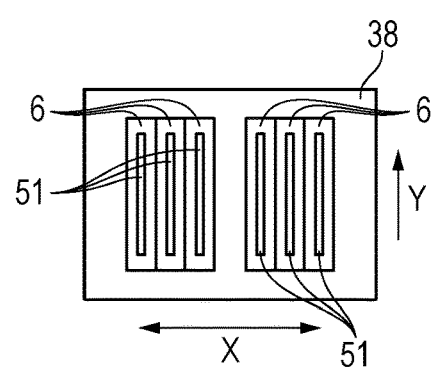

An inkjet printing apparatus that ejects an ink by thermal energy and that includes, in a printing head, a unit configured to heat the ink before ejection based on image data will be described below as an example of an inkjet printing apparatus used for the inkjet printing method according to some embodiments. FIGS. 1A to 1D are schematic diagrams showing an example of an inkjet printing apparatus used for an inkjet printing method according to some embodiments. FIG. 1A is a perspective view of a key portion of the inkjet printing apparatus, and FIG. 1B is a perspective view of a head cartridge. In addition, FIG. 1C is a plan view of printing element substrates disposed on a surface opposite a printing medium in the printing head, viewed in the direction orthogonal to the XY-plane, and FIG. 1D is a perspective view of an enlarged printing element substrate of the six printing element substrates shown in FIG. 1C.

The inkjet printing apparatus includes a conveying unit (not shown in the drawing) configured to convey a printing medium 32 and includes a carriage shaft 34. A head cartridge 36 is mountable on the carriage shaft 34. The head cartridge 36 is provided with a printing head 38, and an ink cartridge 42 or an ink tank, which contains ink, is set into the head cartridge 36. The ink (not shown in the drawing) is ejected from the printing head 38 toward the printing medium 32 while the head cartridge 36 is conveyed along the carriage shaft 34 in the main scanning direction. Further, the printing medium 32 is conveyed in the sub-scanning direction by the conveying unit (not shown in the drawing) and, as a result, an image is printed on the printing medium 32.

The printing head 38 is provided with six printing element substrates 6 and ejects six types of inks. The printing element substrate 6 includes ejection port arrays 51 formed by arraying a plurality of ejection ports 30 in the Y-direction (in FIGS. 1B and 1C, expressed as a line for the sake of simplification). Further, a heating element 50 configured to generate thermal energy for heating the ink in the vicinity of the printing element is formed from a series of a member (for example, aluminum) so as to surround the ejection port arrays 51. The printing element substrate 6 includes a plurality of temperature detection sensors (detection elements) 20 configured to measure the temperature in the vicinity of the printing element. When the ink is ejected, if the ink is heated to a temperature of 50° C. or higher by the heating element, an issue more readily occurs in that an ejection port not in use is blocked by silver particles that fuse in the vicinity of the ejection port, and the ink is not smoothly ejected. When the temperature of the ink is 50° C., the evaporation speed of a liquid component in the ink (at a relative humidity of 50%) is about 4 times the evaporation speed in the case in which the temperature of the ink is 25° C. Even in such a case, the ejection stability of the ink is improved by adopting the configuration according to some embodiments.

Further, if the diameter of the ejection port that ejects the ink is 50 μm or less, an issue more readily occurs in that the ejection port is blocked by silver particles that fuse in the vicinity of the ejection port not in use, and the ink is not smoothly ejected. Evaporation of the liquid component from the ejection port becomes fast as the diameter of the ejection port decreases because heat is readily conducted to the ink. Evaporation of the liquid component from the ejection port is fast in the outer side of the ejection port, and becomes slow toward the center of the ejection port. When the diameter of the ejection port is small, that is, when the opening area of the ejection port is small, the difference in evaporation speed between the outer side and the center of the ejection port is reduced, and the evaporation speed per unit area increases. Consequently, an issue readily occurs in that the amount of the liquid component in the ink evaporated from the ejection port increases, fusion of silver particles at the ejection port not in use is facilitated, the ejection port is blocked, and the ink is not smoothly ejected. Even in such a case, the ejection stability of the ink is improved by adopting the configuration according to some embodiments. The above-described diameter is further preferably 10 μm or more to 30 μm or less.

The ratio of the diameter (μm) of the ejection port to the particle size (nm) of silver particles at a cumulative volume of 90% is 30 times or more in some embodiments. In some embodiments, the particle size of silver particles at a cumulative volume of 90% is 60 nm or less. Silver particles having particle sizes that fall within large-side 10% in the cumulative distribution may have a particle size of more than 60 nm, although the absolute amount is small. When an ink containing silver particles is successively ejected from an ejection port, the absolute amount of silver particles having a large particle size supplied to the ejection port is small and, therefore, the large silver particles exert a small effect. However, if the ink containing the silver particles is further successively ejected from the ejection port, although the absolute amount of silver particles having a large particle size supplied to the ejection port is small, silver particles having a large particle size that adhere to the vicinity of the ejection port are accumulated because silver particles having a large particle size are successively supplied to the ejection port. If the diameter of the ejection port is less than 30 times the above-described particle size at a cumulative volume of 90%, the diameter of the ejection port may be excessively small. When silver particles having a large particle size adhere to the ejection port, the ejection port may be blocked, and ejection stability of the ink may not be sufficiently obtained. In some embodiments, the above-described ratio is preferably 50 times or more and is preferably 1,200 times or less.

Aqueous Ink

An aqueous ink contains silver particles having a particle size of 60 nm or less at a cumulative volume of 90%.

Silver Particles

Silver particles are composed of silver atoms. Silver particles may be configured to contain other metal atoms, oxygen atoms, sulfur atoms, and carbon atoms, in addition to silver atoms. The proportion of silver atoms in silver particles is preferably 50.00% by mass or more.

Examples of methods for forming silver particles include a method in which lumps of silver are ground by using a grinding machine (e.g., a ball mill or a jet mill) (grinding method) and a method in which silver ions or silver complexes are reduced by a reducing agent and are agglomerated (reducing method). In some embodiments, silver particles can be produced by the reducing method from the viewpoint of ease of controlling the particle size of silver particles and the dispersion stability of silver particles.

Particle Size at Cumulative Volume of 90% ($D_{90}$) of Silver Particles

The particle size at a cumulative volume of 90% refers to a particle diameter when the volume of silver particles is accumulated from the small diameter side and reaches 90% with reference to the total volume of measured silver particles in a particle size cumulative curve. $D_{90}$ is set to be 60 nm or less. If $D_{90}$ is more than 60 nm, silver particles readily adhere to the vicinity of the ejection port not in use, the silver particles fuse so as to block the ejection port, and, therefore, ejection stability of the ink is not obtained. Further, when $D_{90}$ is set to be 60 nm or less, the ink adheres to the printing medium, silver particles fuse because the liquid component in the ink permeates the printing medium, and, thereby, a more uniform silver film is formed. As a result, glossiness of the image is improved. In some embodiments, $D_{90}$ is preferably 50 nm or less and is preferably 10 nm or more.

In some embodiments, the particle size at a cumulative volume of 50% of silver particles is preferably 25 nm or less. When the proportion of silver particles having a small particle size in the silver particles increases, the silver particles do not readily precipitate, and the silver particles do not readily adhere to the vicinity of the ejection port not in use. Essentially, the silver particles do not readily adhere to the ejection port, the ejection port is not readily blocked, and, therefore, ejection stability of the ink is improved. $D_{50}$ is preferably 1 nm or more. $D_{50}$ and $D_{90}$ may be measured by analyzing images obtained by a transmission electron microscope (TEM), a scanning electron microscope (SEM), or the like.

Method for Dispersing Silver Particles

The ink can contain a dispersant configured to disperse silver particles. Even if silver particles adhere to the vicinity of the ejection port not in use, the silver particles do not readily fuse with each other because the dispersant is present around the silver particles. Consequently, the ejection port is not readily blocked, and ejection stability of the ink is improved. Examples of methods for dispersing silver particles include a surfactant dispersion type in which a surfactant is used as the dispersant and a resin dispersion type in which a resin is used as the dispersant. As a matter of course, in the ink, silver particles different in dispersing method may be used in combination.

Regarding the surfactant dispersion type, an anionic surfactant, a nonionic surfactant, a cationic surfactant, an amphoteric surfactant, or the like may be used as the surfactant serving as the dispersant. Examples of anionic surfactants include fatty acid salts, alkyl sulfates, alkylaryl sulfonates, alkyl diaryl ether disulfonates, dialkyl sulfosuccinates, alkyl phosphates, naphthalenesulfonic acid formalin condensates, polyoxyethylene alkyl ether sulfates, polyoxyethylene alkylphosphates, and glycerol borate fatty acid esters. Examples of nonionic surfactants include polyoxyethylene alkyl ethers, polyoxyethylene oxypropylene block copolymers, sorbitan fatty acid esters, glycerin fatty acid esters, polyoxyethylene fatty acid esters, polyoxyethylene alkylamines, fluorine-based compounds, and silicone-based compounds. Examples of cationic surfactants include alkylamine salts, quaternary ammonium salts, alkylpyridinium salts, and alkylimidazolium salts. Examples of amphoteric surfactants include alkylamine oxides and phosphatidylcholine.

Regarding the resin dispersion type, a resin serving as the dispersant (resin dispersant) can have both a hydrophilic section and a hydrophobic section. Examples of resins include polyvinyl resins, polyester resins, amino-based resins, acrylic resins, epoxy resins, urethane-based resins, polyether-based resins, polyamide-based resins, unsaturated polyester-based resins, phenol resins, silicone resins, and fluorine-based high-molecular-weight compounds.

In some embodiments, the weight average molecular weight (Mw), obtained by gel permeation chromatography (GPC) of the resin as polystyrene, is preferably 1,000 or more to 100,000 or less, and further preferably 3,000 or more to 50,000 or less.

In particular, when the ink is ejected from a printing head by the action of thermal energy, if silver particles adhere to a heat generating portion, kogation tends to occur due to the heat. In order to suppress an occurrence of kogation, a resin rather than a surfactant can be used as the dispersant. The ink can contain a resin dispersant configured to disperse silver particles.

The ink can contain a resin dispersant configured to disperse silver particles, and the mass ratio of the content (% by mass) of the resin dispersant to the content (% by mass) of silver particles is preferably 0.8 times or less. If the above-described ratio is more than 0.8 times, the amount of resin dispersant is excessively large relative to silver particles, and, thereby, silver particles do not readily approach each other. Consequently, even when the ink containing silver particles is applied to a printing medium, silver particles do not readily fuse with each other. As a result, the glossiness of an image may not be sufficiently obtained. In some embodiments, the above-described ratio is preferably 0.02 times or more and further preferably 0.2 times or more.

In some embodiments, the content of silver particles is preferably 6.00% by mass or less with reference to the total mass of the ink. If the content is more than 6.00% by mass, the amount of silver particles is excessively large, and precipitated silver particles in the state of adjoining each other tend to adhere to the vicinity of the ejection port. Consequently, silver particles may fuse, the ejection port may be blocked, and sufficient ejection stability of the ink may not be obtained. The above-described content is preferably 2.00% by mass or more. If the content is less than 2.00% by mass, the amount of silver particles is excessively small, and even when the ink containing silver particles is applied to a printing medium, a silver film is not readily formed on the printing medium, and sufficient glossiness of the image may not be obtained. In particular, in some embodiments, the content is further preferably 2.50% by mass or more.

First Water-Soluble Organic Solvent

The ink can contain a first water-soluble organic solvent having a boiling temperature of 180° C. or higher at a temperature of 25° C. and 1 atmospheric pressure, and the mass ratio of the content (% by mass) of the first water-soluble organic solvent to the content (% by mass) of silver particles is preferably 2.5 times or more. In the case in which a heated ink is used, evaporation of the liquid component from the ejection port is suppressed by including the first water-soluble organic solvent having a boiling temperature of 180° C. or higher into the ink. Consequently, fusion of silver particles adhering to the vicinity of the ejection port is not facilitated, the ejection port is not readily blocked, and ejection stability of the ink is improved. If the above-described ratio is less than 2.5 times, the amount of the first water-soluble organic solvent is small relative to silver particles, evaporation of the liquid component from the ejection port is not suppressed, and sufficient ejection stability of the ink may not be obtained. The above-described ratio is preferably 4.5 times or less.

Specific examples of the first water-soluble organic solvent include glycerin (290° C.), triethylene glycol (287° C.), dipropylene glycol monomethyl ether (189° C.), and ethylene glycol (187° C.) (a numerical value in parentheses indicates a boiling temperature at a temperature of 25° C. and 1 atmospheric pressure). The content of the first water-soluble organic solvent is preferably 15.00% by mass or more with reference to the total mass of the ink. The above-described content is preferably 25.00% by mass.

Alkanol Amine

The ink can contain an alkanol amine. The alkanol amine is a compound in which an alkane skeleton has a hydroxy group and an amino group. In the ink, silver particle surfaces tend to be positively charged. Nitrogen atoms of amino groups included in the alkanol amine have unshared electron pairs and, therefore, are attracted by the positively charged silver particle surfaces. Consequently, the silver particle surfaces are neutralized, and the reactivity of the silver particle surfaces is suppressed. Further, hydroxy groups included in the alkanol amine readily conform to water in the ink so as to stably disperse silver particles. As a result, fusion of silver particles adhering to the vicinity of the ejection port is not facilitated, the ejection port is not readily blocked, and ejection stability of the ink is improved. Meanwhile, the ink is usually alkaline. Nitrogen atoms of amino groups included in the alkanol amine maintain alkalinity of the ink by attracting hydrogen atoms present in the ink.

In some embodiments, in the alkanol amine, the alkane skeleton has a carbon number of preferably 1 or more to 3 or less. Examples of alkanol amines include methanol amine, ethanol amine, propanol amine, dimethylethanol amine, triethanol amine, and triisopropanol amine. In particular, the alkanol amine can be an alkanol amine having three hydroxy groups, for example, triethanol amine or triisopropanol amine. In some embodiments, the content of alkanol amine in the ink is preferably 0.01% by mass or more to 1.00% by mass or less with reference to the total mass of the ink.

Aqueous Medium

The ink contains an aqueous medium that is water or a mixed solvent of water and an organic solvent. Deionized water (ion-exchanged water) can be used as the water. Regarding the water-soluble organic solvent, water-soluble organic solvents other than the first water-soluble organic solvent that is used as the situation demands (other water-soluble organic solvents) may be used in addition. There is no particular limitation regarding the other water-soluble organic solvents, and any organic solvent usable for an inkjet ink, for example, alcohols, glycols, glycol ethers, and nitrogen-containing compounds, may be used. At least one of the other water-soluble organic solvents may be contained in the ink. In this regard, in order to avoid a momentary increase in the concentration of silver particles due to rapid evaporation at an ejection port, the content of a water-soluble organic solvent having a boiling temperature of 80° C. or lower is preferably 10.00% by mass or less and further preferably 0.00% by mass.

In some embodiments, the content of water in the ink is preferably 50.00% by mass or more to 88.00% by mass or less with reference to the total mass of the ink. The content of the water-soluble organic solvent in the ink is preferably 10.00% by mass or more to 50.00% by mass or less and further preferably 20.00% by mass or more to 50.00% by mass or less with reference to the total mass of the ink. If the content of the water-soluble organic solvent is less than 10.00% by mass, the reliability (e.g., sticking resistance) may not be sufficiently obtained when the ink is used for an inkjet printing apparatus. Meanwhile, if the content of the water-soluble organic solvent is more than 50.00% by mass, the viscosity of the ink may increase and poor supply of the ink may occur.

Other Components

The ink may contain, in addition to the above-described components, a water-soluble organic compound that is solid at a temperature of 25° C., for example, urea or a derivative thereof; trimethylol propane, or trimethylol ethane. The ink may contain various additives (e.g., a pH adjuster, a debubbling agent, a rust inhibitor, a preservative, a fungicide, an antioxidant, a reducing inhibitor, and a chelating agent) as the situation demands.

Physical Properties of Ink

In some embodiments, the viscosity of the ink is preferably 3.5 mPa·s or less at a temperature of 25° C. If the viscosity is more than 3.5 mPa·s, when the ink is repeatedly ejected from the ejection port, supply of the ink to the ejection port may become insufficient, and sufficient ejection stability of the ink may not be obtained. The viscosity is preferably 2.0 mPa·s or more. The surface tension of the ink at a temperature of 25° C. is preferably 10 mN/m or more to 60 mN/m or less, more preferably 20 mN/m or more to 60 mN/m or less, and further preferably 30 mN/m or more to 40 mN/m or less. The surface tension of the ink is appropriately adjusted by changing the content or the type of the surfactant, the water-soluble organic solvent, or the like in the ink.

EXAMPLES

Some embodiments will be described below in further detail with reference to the examples and the comparative examples, but not all embodiments are limited to the examples described below. In this regard, the amount of the component expressed in "part" or "%" is on a mass basis, unless otherwise specified.

Preparation of Silver Particle Dispersion Liquid

Silver particle dispersion liquids A to G, I to L, and N were obtained in conformity with a preparation method described in example 2 of PCT Japanese Translation Patent Publication No. 2010-507727 such that the content of the silver particles and the content of the resin dispersant were set to be the values shown in Table 1. Further, silver particle dispersion liquids H and M were obtained in conformity with a preparation method described in example 1 of Japanese Patent Laid-Open No. 2004-315650 such that the content of the silver particles and the content of the resin dispersant were set to be the values shown in Table 1. The particle sizes ($D_{90}$ and $D_{50}$) of silver particles were measured on the basis of analysis of the images obtained by a scanning electron microscope (SEM), and are shown in Table 1. The particle size at a cumulative volume of 50% ($D_{50}$) and the particle size at a cumulative volume of 90% ($D_{90}$) of the silver particles are shown in Table 1. In this regard, $D_{50}$ and $D_{90}$ of the silver particles may be adjusted by changing the time, the speed, or the preparatory section of centrifugal separation by using a centrifugal separator.

Liquid Containing Silver Particles

Addition of 100 mL of 0.83-mol/L silver nitrate aqueous solution (produced by Wako Pure Chemical Industries, Ltd.) to 500 mL of water containing 0.25-mol/L iron (II) sulfate heptahydrate (produced by Wako Pure Chemical Industries, Ltd.) and 0.50-mol/L trisodium citrate dihydrate (produced by Wako Pure Chemical Industries, Ltd.) was performed over 3 seconds. The resulting solution was agitated at 300 rpm at a temperature of 20° C. for 30 seconds. The resulting solution was subjected to centrifugal separation at 3,000 rpm, and collected solid contents were dispersed into water so as to obtain a silver-particle-containing liquid having a silver particle content value shown in Table 1. The particle size at a cumulative volume of 50% ($D_{50}$) and the particle size at a cumulative volume of 90% ($D_{90}$) of the silver particles are shown in Table 1. In this regard, $D_{50}$ and $D_{90}$ of the silver particles may be adjusted by changing the time, the speed, or the preparatory section of centrifugal separation by using a centrifugal separator.

Preparation of C.I. Pigment Blue 15:3 Dispersion Liquid
le;.4qMixing of 15.00 parts of pigment, 30.00 parts of liquid containing a resin, and 10.00 parts of ion-exchanged water was performed. Regarding the pigment, C.I. Pigment Blue 15:3 (CHROMOFINE 4927, produced by Dainichiseika Color & Chemicals Mfg. Co., Ltd.) was used. A liquid used as the liquid containing a resin was produced by neutralizing a styrene-acrylic acid copolymer (Joncryl 680, produced by BASF) with 0.85 equivalent of potassium hydroxide aqueous solution relative to the acid value of the copolymer and had a resin content of 30.00%. The resulting mixture was dispersed for 3 hours by using a batch-type vertical sand mill (produced by IMEX CO., Ltd.) that was filled with 85.00 parts of zirconia beads having a particle diameter of 0.3 mm while water cooling was performed. Thereafter, the resulting dispersion liquid was subjected to centrifugal separation treatment so as to remove coarse particles, and pressure filtration was performed by using a cellulose acetate filter (produced by ADVANTEC) having a pore size of 3.0 μm. C.I. Pigment Blue 15:3 dispersion liquids 1 and 2 in the state in which C.I. Pigment Blue 15:3 was dispersed in water by a resin (pigment content of 15.00% and resin content of 9.00%) were obtained by the above-described method. In C.I. Pigment Blue 15:3 dispersion liquid 1, C.I. Pigment Blue 15:3 had the particle size at a cumulative volume of 50% ($D_{50}$) of 38 nm and the particle size at a cumulative volume of 90% ($D_{90}$) of 65 nm. In C.I. Pigment Blue 15:3 dispersion liquid 2, C.I. Pigment Blue 15:3 had the particle size at a cumulative volume of 50% ($D_{50}$) of 22 nm, and the particle size at a cumulative volume of 90% ($D_{90}$) of 45 nm. In this regard, $D_{50}$ and $D_{90}$ of C.I. Pigment Blue 15:3 may be adjusted by changing the time, the speed, or the preparatory section of centrifugal separation by using a centrifugal separator.

TABLE 1

Characteristics of silver particle dispersion liquid

| Silver particle dispersion liquid | Content of silver particles (%) | Content of resin dispersant (%) | Content of resin dispersant/content of silver particles (time) | $D_{50}$ (nm) | $D_{90}$ (nm) |
| --- | --- | --- | --- | --- | --- |
| Silver particle dispersion liquid A | 30.0 | 18.0 | 0.6 | 22 | 45 |
| Silver particle dispersion liquid B | 30.0 | 18.0 | 0.6 | 25 | 60 |
| Silver particle dispersion liquid C | 30.0 | 18.0 | 0.6 | 19 | 50 |
| Silver particle dispersion liquid D | 30.0 | 18.0 | 0.6 | 33 | 57 |
| Silver particle dispersion liquid E | 30.0 | 18.0 | 0.6 | 25 | 45 |
| Silver particle dispersion liquid F | 30.0 | 18.0 | 0.6 | 27 | 48 |
| Silver particle dispersion liquid G | 30.0 | 9.0 | 0.3 | 24 | 45 |
| Silver particle dispersion liquid H | 30.0 | 0.0 | 0.0 | 23 | 49 |
| Silver particle dispersion liquid I | 30.0 | 24.0 | 0.8 | 21 | 46 |
| Silver particle dispersion liquid J | 30.0 | 30.0 | 1.0 | 20 | 46 |
| Silver particle dispersion liquid K | 30.0 | 30.0 | 1.0 | 34 | 55 |
| Silver particle dispersion liquid L | 30.0 | 18.0 | 0.6 | 38 | 65 |
| Silver particle dispersion liquid M | 30.0 | 0.0 | 0.0 | 38 | 70 |
| Silver particle dispersion liquid N | 30.0 | 18.0 | 0.6 | 19 | 70 |
| Liquid containing silver particles | 30.0 | 0.0 | 0.0 | 22 | 45 |

Preparation of Ink

Each ink shown in Table 2 or Table 3 was prepared by mixing components shown in the table, performing agitation sufficiently, and performing pressure filtration by using a microfilter having a pore size of 3.0 μm (produced by FUJIFILM Corporation). NIKKOL BL9EX was a nonionic surfactant produced by Nikko Chemicals Co., Ltd., and was a polyoxyethylene lauryl ether. In lower parts of Tables 2 and 3, silver particle content A (%), first water-soluble organic solvent content H (%), and the mass ratio of first water-soluble organic solvent content H to silver particle content A (in Tables 2 and 3, expressed as H/A (time)) are shown. In addition, the viscosity (mPa·s) of the ink is shown. In Tables 2 and 3, a numerical value in parentheses indicates the value of a boiling temperature.

TABLE 2

Composition and characteristics of ink

| | Ink No. | | | | | | | | | | | | | | |
| --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 |
| Silver particle dispersion liquid A | 15.00 | | | | | | 20.00 | 23.40 | | | | | | 15.00 | 15.00 |
| Silver particle dispersion liquid B | | 15.00 | | | | | | | | | | | | | |

TABLE 2-continued

| Composition and characteristics of ink | | | | | | | | | | | | | | | |
|---|---|---|---|---|---|---|---|---|---|---|---|---|---|---|---|
| | Ink No. | | | | | | | | | | | | | | |
| | 1 | 2 | 3 | 4 | 5 | 6 | 7 | 8 | 9 | 10 | 11 | 12 | 13 | 14 | 15 |
| Silver particle dispersion liquid C | | 15.00 | | | | | | | | | | | | | |
| Silver particle dispersion liquid D | | | 15.00 | | | | | | | | | | | | |
| Silver particle dispersion liquid E | | | | 15.00 | | | | | | | | | | | |
| Silver particle dispersion liquid F | | | | | 15.00 | | | | | | | | | | |
| Silver particle dispersion liquid G | | | | | | | | | | 15.00 | | | | | |
| Silver particle dispersion liquid H | | | | | | | | | | | 15.00 | | | | |
| Silver particle dispersion liquid I | | | | | | | | | | | | 15.00 | | | |
| Silver particle dispersion liquid J | | | | | | | | | | | | | 15.00 | | |
| Silver particle dispersion liquid K | | | | | | | | | | | | | | | |
| Silver particle dispersion liquid L | | | | | | | | | | | | | | | |
| Silver particle dispersion liquid M | | | | | | | | | | | | | | | |
| Silver particle dispersion liquid N | | | | | | | | | | | | | | | |
| Liquid containing silver particles | | | | | | | | | 15.00 | | | | | | |
| C.I. Pigment Blue 15:3 dispersion liquid 1 | | | | | | | | | | | | | | | |
| C.I. Pigment Blue 15:3 dispersion liquid 2 | | | | | | | | | | | | | | | |
| Ethylene glycol (197) | 20.00 | 20.00 | 20.00 | 20.00 | 20.00 | 20.00 | 20.00 | 20.00 | 20.00 | 20.00 | 20.00 | 20.00 | 20.00 | | 10.50 |
| Glycerin (290) | | | | | | | | | | | | | | | |
| Triethylene glycol (287) | | | | | | | | | | | | | | | |
| Propylene glycol (187) | | | | | | | | | | | | | | | |
| Ethylene glycol mono-n-butyl ether (171) | | | | | | | | | | | | | | 20.00 | 9.50 |
| Ethylene glycol monomethyl ether (124) | | | | | | | | | | | | | | | |
| Triethanol amine | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| Triisopropanol amine | | | | | | | | | | | | | | | |
| Ethanol amine | | | | | | | | | | | | | | | |
| NIKKOL BL9EX | 0.15 | 0.15 | 0.15 | 0.15 | 0.15 | 0.15 | 0.15 | 0.50 | 0.50 | 0.15 | 0.15 | 0.15 | 0.15 | 0.15 | 0.15 |
| Ion-exchanged water | 64.35 | 64.35 | 64.35 | 64.35 | 64.35 | 64.35 | 59.35 | 55.60 | 64.00 | 64.35 | 64.35 | 64.35 | 64.35 | 64.35 | 64.35 |
| Silver particle content A (%) | 4.50 | 4.50 | 4.50 | 4.50 | 4.50 | 4.50 | 6.00 | 7.02 | 4.50 | 4.50 | 4.50 | 4.50 | 4.5 | 4.50 | 4.50 |
| First water-soluble organic solvent content H (%) | 20.00 | 20.00 | 20.00 | 20.00 | 20.00 | 20.00 | 20.00 | 20.00 | 20.00 | 20.00 | 20.00 | 20.00 | 20.00 | 0.00 | 10.50 |
| H/A (time) | 4.4 | 4.4 | 4.4 | 4.4 | 4.4 | 4.4 | 3.3 | 2.8 | 4.4 | 4.4 | 4.4 | 4.4 | 4.4 | 0.0 | 2.3 |
| Viscosity of ink (mPa · s) | 2.4 | 2.4 | 2.4 | 2.3 | 2.4 | 2.4 | 3.0 | 3.3 | 2.0 | 2.2 | 2.2 | 2.6 | 2.8 | 2.4 | 2.5 |

TABLE 3

| Composition and characteristics of ink | | | | | | | | | | | | | | | |
|---|---|---|---|---|---|---|---|---|---|---|---|---|---|---|---|
| | Ink No. | | | | | | | | | | | | | | |
| | 16 | 17 | 18 | 19 | 20 | 21 | 22 | 23 | 24 | 25 | 26 | 27 | 28 | 29 | 30 |
| Silver particle dispersion liquid A | 15.00 | 15.00 | 15.00 | 15.00 | 15.00 | 15.00 | 15.00 | 15.00 | 15.00 | | | | | | |
| Silver particle dispersion liquid B | | | | | | | | | | | | | | | |
| Silver particle dispersion liquid C | | | | | | | | | | | | | | | |
| Silver particle dispersion liquid D | | | | | | | | | | | | | | | |
| Silver particle dispersion liquid E | | | | | | | | | | | | | | | |

TABLE 3-continued

Composition and characteristics of ink

| | Ink No. | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Silver particle dispersion liquid F | | | | | | | | | | | | | | | |
| Silver particle dispersion liquid G | | | | | | | | | | | | | | | |
| Silver particle dispersion liquid H | | | | | | | | | | | | | | | |
| Silver particle dispersion liquid I | | | | | | | | | | | | | | | |
| Silver particle dispersion liquid J | | | | | | | | | | | | | | | |
| Silver particle dispersion liquid K | | | | | | | | | | 23.40 | | | | | |
| Silver particle dispersion liquid L | | | | | | | | | | | 15.00 | | | | |
| Silver particle dispersion liquid M | | | | | | | | | | | | 15.00 | | | |
| Silver particle dispersion liquid N | | | | | | | | | | | | | 15.00 | | |
| Liquid containing silver particles | | | | | | | | | | | | | | | |
| C.I. Pigment Blue 15:3 dispersion liquid 1 | | | | | | | | | | | | | | 30.00 | |
| C.I. Pigment Blue 15:3 dispersion liquid 2 | | | | | | | | | | | | | | | 30.00 |
| Ethylene glycol (197) | 10.50 | 11.40 | 15.00 | | | | 20.00 | 20.00 | 20.00 | 14.00 | 20.00 | 20.00 | 20.00 | 20.00 | 20.00 |
| Glycerin (290) | | | | 20.00 | | | | | | | | | | | |
| Triethylene glycol (287) | | | | | 20.00 | | | | | | | | | | |
| Propylene glycol (187) | | | | | | 20.00 | | | | | | | | | |
| Ethylene glycol mono-n-butyl ether (171) | | 8.60 | 5.00 | | | | | | | 6.00 | | | | | |
| Ethylene glycol monomethyl ether (124) | 9.50 | | | | | | | | | | | | | | |
| Triethanol amine | 0.50 | 0.50 | 0.50 | 0.50 | 0.50 | 0.50 | | | | 0.50 | 0.50 | 0.50 | 0.50 | 0.50 |
| Triisopropanol amine | | | | | | | 0.50 | | | | | | | | |
| Ethanol amine | | | | | | | | 0.50 | | | | | | | |
| NIKKOL BL9EX | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Ion-exchanged water | 64.35 | 64.35 | 64.35 | 64.35 | 64.35 | 64.35 | 64.35 | 64.35 | 64.85 | 56.45 | 64.35 | 64.35 | 64.35 | 49.35 | 49.35 |
| Silver particle content A (%) | 4.50 | 4.50 | 4.50 | 4.50 | 4.50 | 4.50 | 4.50 | 4.50 | 4.50 | 7.02 | 4.50 | 4.50 | 4.50 | 4.50 | 4.50 |
| First water-soluble organic solvent content H (%) | 10.50 | 11.40 | 15.00 | 20.00 | 20.00 | 20.00 | 20.00 | 20.00 | 20.00 | 14.00 | 20.00 | 20.00 | 20.00 | 20.00 | 20.00 |
| H/A (times) | 2.3 | 2.5 | 3.3 | 4.4 | 4.4 | 4.4 | 4.4 | 4.4 | 4.4 | 2.0 | 4.4 | 4.4 | 4.4 | 4.4 | 4.4 |
| Viscosity of ink (mPa · s) | 2.5 | 2.5 | 2.4 | 2.5 | 2.5 | 2.5 | 2.4 | 2.3 | 2.4 | 3.8 | 2.4 | 2.3 | 2.3 | 2.4 | 2.3 |

Evaluation

In some embodiments, AA, A, or B in the following evaluation criteria was assumed to be a tolerable level, and C or D was assumed to be an intolerable level. The evaluation results are shown in Table 5. Regarding the particle sizes ($D_{90}$ and $D_{50}$) of silver particles in the inks used in the examples, the comparative examples, and the reference examples, there was no difference between a temperature of 25° C. and a temperature of 50° C.

Ejection Stability of Ink

Each ink cartridge was filled with one of the inks obtained as described above and set into one of the inkjet printing apparatuses [1] to [7] shown in Table 4. In Table 4, preheating before ejection based on image data refers to heating by a heating element present in the vicinity of a printing element that ejects the ink. Preheating during ejection based on image data refers to heating by applying a preheat pulse with energy in an amount that does not cause ejection by itself before a main heat pulse configured to eject the ink for the purpose of ejecting the ink once. When a printing head including a heat dissipation plate is used, the ink is not readily heated because the printing head has a configuration in which heat is readily dissipated. When a printing head including no heat dissipation plate is used, the ink is readily heated because the printing head has a configuration in which heat is not readily dissipated. Meanwhile, when the ejection frequency of the ink is 8 kHz or more, the ink is readily heated.

An inkjet printing apparatus in which the diameter (μm) of the ejection port was appropriately changed was used, as shown in Table 5, and the ink heated to an ink temperature (° C.) shown in Table 5 was ejected from the printing head. An image printed under the condition in which 1 ink droplet of 11.2 ng was applied to a unit region of 1/1,200 inch×1/1,200 inch was denoted as an image with a printing duty of 100%. The inkjet printing apparatus was used, and a solid image with a printing duty of 100% was printed on CANON Photo Paper (Glossy Pro Platinum Grade, produced by CANON KABUSHIKI KAISHA).

TABLE 4

Configuration of inkjet printing apparatus

| | Inkjet printing apparatus No. | | | | | | |
|---|---|---|---|---|---|---|---|
| | [1] | [2] | [3] | [4] | [5] | [6] | [7] |
| Ink ejection system | heat | heat | heat | heat | mechanical | heat | mechanical |
| Preheating before ejection based on image data | yes | none | none | none | yes | none | none |
| Heating during ejection based on image data | none | none | yes | none | none | none | none |
| Heat dissipation plate | yes | none | yes | yes | yes | yes | yes |
| Ink ejection frequency | 6 kHz | 6 kHz | 6 kHz | 8 kHz | 6 kHz | 6 kHz | 6 kHz |

An A4-size solid image with a printing duty of 100% was printed by using a sheet-feed-side half of successive ejection ports in the ejection port array direction. After 5 sheets, 10 sheets, or 15 sheets of solid images were printed, an A4-size solid image was printed by using all the ejection ports, and whether a streak due to non-ejection was generated in the resulting solid image was examined. Evaluation of ejection stability was performed on the basis of the following evaluation criteria.

A: no streak due to non-ejection was generated in the solid image after 15 sheets were printed.
B: no streak due to non-ejection was generated in the solid image after 10 sheets were printed, and a streak due to non-ejection was generated in the solid image after 15 sheets were printed.
C: no streak due to non-ejection was generated in the solid image after 5 sheets were printed, and a streak due to non-ejection was generated in the solid image after 10 sheets were printed.
D: a streak due to non-ejection was generated in the solid image after 5 sheets were printed.

Glossiness of Image

Each ink cartridge was filled with one of the inks obtained as described above and set into an inkjet printing apparatuses (PIXUS MG3530, produced by CANON KABUSHIKI KAISHA). An image printed under the condition in which 1 ink droplet of 11.2 ng was applied to a unit region of 1/1,200 inch×1/1,200 inch was denoted as an image with a printing duty of 100%. The inkjet printing apparatus was used, and an A4-size solid image with a printing duty of 100% was printed on CANON Photo Paper (Glossy Pro Platinum Grade, produced by CANON KABUSHIKI KAISHA). The solid image was air-dried for 24 hours and, thereafter, the specular glossiness at an angle of 20 degrees based on JIS Z 8741 was measured by using a glossmeter (VG 7000, produced by NIPPON DENSHOKU INDUSTRIES CO., LTD.). Evaluation of glossiness was performed on the basis of the following evaluation criteria.

AA: the glossiness was 600 or more.
A: the glossiness was 400 or more to less than 600.
B: the glossiness was less than 400.

TABLE 5

Evaluation result

| | | Evaluation condition | | | | Evaluation result | |
|---|---|---|---|---|---|---|---|
| | Type of ink | Diameter of ejection port (μm) | Diameter of ejection port. (μm)/$D_{90}$(nm) | Temperature of ink (° C.) | Apparatus | Ejection stability | Glossiness |
| Example 1 | 1 | 20 | 444 | 52 | [1] | A | AA |
| Example 2 | 1 | 20 | 444 | 70 | [1] | A | AA |
| Example 3 | 1 | 20 | 444 | 52 | [2] | A | AA |
| Example 4 | 1 | 20 | 444 | 52 | [3] | A | AA |
| Example 5 | 1 | 20 | 444 | 52 | [4] | A | AA |
| Example 6 | 1 | 20 | 444 | 52 | [5] | A | AA |
| Example 7 | 2 | 20 | 333 | 52 | [1] | B | AA |
| Example 8 | 1 | 50 | 1111 | 52 | [1] | A | AA |
| Example 9 | 1 | 60 | 1333 | 52 | [1] | A | AA |
| Example 10 | 1 | 1.2 | 27 | 52 | [1] | B | AA |
| Example 11 | 1 | 1.4 | 31 | 52 | [1] | A | AA |
| Example 12 | 1 | 20 | 444 | 50 | [1] | A | AA |
| Example 13 | 3 | 20 | 400 | 52 | [1] | A | AA |
| Example 14 | 4 | 20 | 351 | 52 | [1] | B | AA |
| Example 15 | 5 | 20 | 444 | 52 | [1] | A | AA |
| Example 16 | 6 | 20 | 417 | 52 | [1] | B | AA |
| Example 17 | 7 | 20 | 444 | 52 | [1] | A | AA |
| Example 18 | 8 | 20 | 444 | 52 | [1] | B | A |
| Example 19 | 9 | 20 | 444 | 52 | [1] | B | A |
| Example 20 | 10 | 20 | 444 | 52 | [1] | A | AA |
| Example 21 | 11 | 20 | 408 | 52 | [1] | A | AA |
| Example 22 | 12 | 20 | 435 | 52 | [1] | A | AA |
| Example 23 | 13 | 20 | 435 | 52 | [1] | B | A |
| Example 24 | 14 | 20 | 444 | 52 | [1] | B | AA |
| Example 25 | 15 | 20 | 444 | 52 | [1] | B | AA |

TABLE 5-continued

| | Evaluation condition | | | | | Evaluation result | |
|---|---|---|---|---|---|---|---|
| | Type of ink | Diameter of ejection port (μm) | Diameter of ejection port. (μm)/$D_{90}$(nm) | Temperature of ink (° C.) | Apparatus | Ejection stability | Glossiness |
| Example 26 | 16 | 20 | 444 | 52 | [1] | B | AA |
| Example 27 | 17 | 20 | 444 | 52 | [1] | A | AA |
| Example 28 | 18 | 20 | 444 | 52 | [1] | A | AA |
| Example 29 | 19 | 20 | 444 | 52 | [1] | A | AA |
| Example 30 | 20 | 20 | 444 | 52 | [1] | A | AA |
| Example 31 | 21 | 20 | 444 | 52 | [1] | A | AA |
| Example 32 | 22 | 20 | 444 | 52 | [1] | A | AA |
| Example 33 | 23 | 20 | 444 | 52 | [1] | B | AA |
| Example 34 | 24 | 20 | 444 | 52 | [1] | B | AA |
| Example 35 | 25 | 20 | 364 | 52 | [1] | B | B |
| Comparative example 1 | 26 | 20 | 308 | 52 | [1] | D | B |
| Comparative example 2 | 27 | 20 | 286 | 52 | [1] | C | B |
| Comparative example 3 | 28 | 20 | 286 | 52 | [1] | D | B |
| Reference example 1 | 1 | 20 | 444 | 25 | [6] | A | — |
| Reference example 2 | 26 | 20 | 308 | 25 | [6] | A | — |
| Reference example 3 | 26 | 60 | 923 | 52 | [1] | A | — |
| Reference example 4 | 26 | 20 | 308 | 25 | [7] | A | — |
| Reference example 5 | 29 | 20 | 308 | 52 | [1] | A | — |
| Reference example 6 | 30 | 20 | 444 | 52 | [1] | A | — |

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-199627, which was filed on Oct. 13, 2017 and which is hereby incorporated by reference herein in its entirety, and No. 2018-162154, which was filed on Aug. 30, 2018 and which is hereby incorporated by reference herein in its entirety.

What is claimed is:

1. An inkjet printing method comprising the step of:
ejecting a heated aqueous ink from a printing head so as to print an image on a printing medium,
wherein the aqueous ink comprises silver particles having a particle size of 60 nm or less at a cumulative volume of 90%,
wherein the aqueous ink comprises a first water-soluble organic solvent having a boiling temperature of 180° C. or higher, and
wherein a mass ratio of a content (% by mass) of the first water-soluble organic solvent to a content (% by mass) of the silver particles is 2.5 times or more.

2. The inkjet printing method according to claim 1, wherein a diameter (μm) of an ejection port of the printing head is 50 μm or less.

3. The inkjet printing method according to claim 2, wherein a ratio of the diameter (μm)*1000 of the ejection port of the printing head to the particle size (nm) of the silver particles at a cumulative volume of 90% is 30 times or more.

4. The inkjet printing method according to claim 3, wherein the ratio of the diameter (μm) of the ejection port of the printing head to the particle size (nm) of the silver particles at a cumulative volume of 90% is also 1,200 times or less.

5. The inkjet printing method according to claim 1, wherein a temperature of the aqueous ink ejected from the printing head is 50° C. or higher.

6. The inkjet printing method according to claim 5, wherein the temperature of the aqueous ink ejected from the printing head is also 70° C. or lower.

7. The inkjet printing method according to claim 1, wherein the particle size of the silver particles at a cumulative volume of 90% is 50 nm or less.

8. The inkjet printing method according to claim 1, wherein a particle size of the silver particles at a cumulative volume of 50% is 25 nm or less.

9. The inkjet printing method according to claim 8, wherein the particle size of the silver particles at a cumulative volume of 50% is also 1 nm or more.

10. The inkjet printing method according to claim 1, wherein a content of the silver particles is 6.00% by mass or less.

11. The inkjet printing method according to claim 10, wherein the content of the silver particles is also 2.00% by mass or more.

12. The inkjet printing method according to claim 1,
wherein the aqueous ink comprises a resin dispersant configured to disperse the silver particles,
wherein a mass ratio of a content (% by mass) of the resin dispersant to a content (% by mass) of the silver particles is 0.8 times or less.

13. The inkjet printing method according to claim 12, wherein the mass ratio of the content (% by mass) of the resin dispersant to the content (% by mass) of the silver particles is also 0.2 times or more.

14. The inkjet printing method according to claim 1, wherein the aqueous ink comprises an alkanol amine.

15. The inkjet printing method according to claim 14, wherein a content (% by mass) of the alkanol amine in the ink is 0.01% by mass or to 1.00% by mass with reference to the total mass of the ink.

16. The inkjet printing method according to claim 1, wherein the particle size of the silver particles at a cumulative volume of 90% is also 10 nm or more.

17. The inkjet printing method according to claim 1, wherein a diameter (μm) of an ejection port of the printing head is 10 μm or more to 30 μm or less.

18. The inkjet printing method according to claim 1, wherein the mass ratio of the content (% by mass) of the first water-soluble organic solvent to the content (% by mass) of the silver particles is 4.5 times or less.

19. The inkjet printing method according to claim 1, wherein the content (% by mass) of the first water-soluble organic solvent is 15.00% by mass or to 25.00% by mass with reference to the total mass of the ink.

20. An inkjet printing apparatus comprising:
   an aqueous ink;
   a printing head configured to eject the aqueous ink; and
   a unit configured to heat the aqueous ink in the printing head,
   wherein the aqueous ink comprises silver particles having a particle size of 60 nm or less at a cumulative volume of 90%,
   wherein the aqueous ink comprises a first water-soluble organic solvent having a boiling temperature of 180° C. or higher, and
   wherein a mass ratio of a content (% by mass) of the first water-soluble organic solvent to a content (% by mass) of the silver particles is 2.5 times or more.

* * * * *